P. MURPHY.
HEADLIGHT CONTROL.
APPLICATION FILED JUNE 10, 1914.

1,147,535.

Patented July 20, 1915.

Witnesses
Gerald Hennesy
P. M. Smith

Inventor
Purl Murphy,
By Victor J. Evans
Attorney

COLUMBIA PLANOGRAPH CO., WASHINGTON, D. C.

UNITED STATES PATENT OFFICE.

PURL MURPHY, OF ST. CLAIR, MISSOURI.

HEADLIGHT CONTROL.

1,147,535. Specification of Letters Patent. Patented July 20, 1915.

Application filed June 10, 1914. Serial No. 844,265.

*To all whom it may concern:*

Be it known that I, PURL MURPHY, a citizen of the United States, residing at St. Clair, in the county of Franklin and State of Missouri, have invented new and useful Improvements in Headlight Controls, of which the following is a specification.

This invention relates to headlamp controls for motor vehicles, the object in view being to provide simple and practical headlamp turning mechanism for causing the headlamps to turn in accordance with the steering wheels for the purpose of throwing the rays of light on the road in accordance with the path to be traveled by the machine, the said lamp controlling means being shiftable to an operative or inoperative position by simple means under the control of the driver in his seat on the machine. Thus in the day time, when the headlamps are not being used, the lamp turning mechanism is inoperative and wear and tear thereon is prevented. After night fall or when the lamps are in use, the lamp controlling or turning mechanism may be quickly thrown into its operative position by the driver without leaving his seat.

With the above and other objects in view, the invention consists in the novel construction, combination and arrangement of parts, as herein described, illustrated and claimed.

Figure 1:
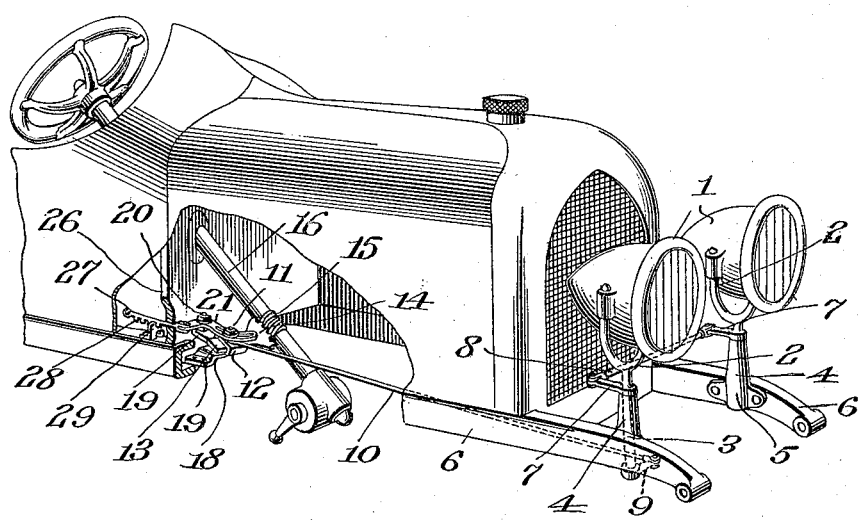
Figure 2:
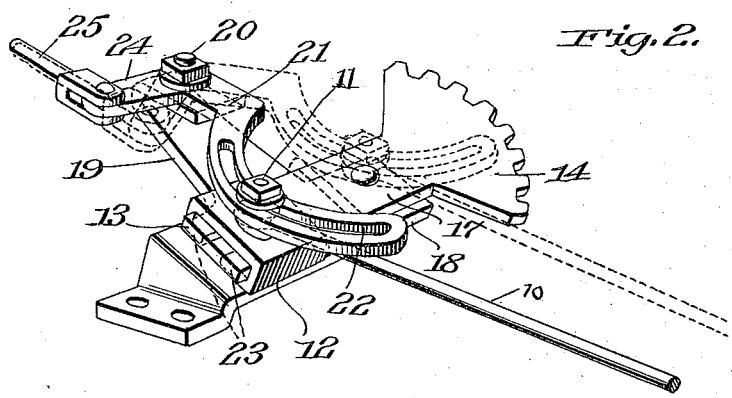

In the accompanying drawings:—Figure 1 is a perspective view partly broken away of the forward portion of an automobile showing the lamp controlling mechanism of this invention applied thereto. Fig. 2 is an enlarged detail perspective view of a portion of said mechanism showing the means for throwing the lamp controlling elements into and out of operation.

Referring to the drawings 1 designates the usual head lamps of an automobile which, under the present invention, are supported by forks 2 having vertical journal portions 3 which are mounted to turn in the sleeves or bearings 4 of a pair of lamp supporting brackets 5 secured to the side frame bars 6 of the chassis.

The vertical posts of the lamps are provided with laterally extending arms 7 which are connected by a rod 8 to cause both of said lamps to turn in unison. One of the lamp posts is provided at its lower end with an arm 9 from which a connecting rod 10 extends rearwardly as shown in Fig. 1, said rod being connected at its rear extremity to a pin 11 which extends upwardly from a slidable runner 12 mounted for movement longitudinally of the arm 13 of a toothed sector 14, said sector meshing with and being actuated by a gear 15 such as a worm on the steering shaft 16 of the motor vehicle. The sector 14 together with the arm 13 constitute a sector lever which is fulcrumed at the point 17 on a supporting bracket 18 connected at 19 to the machine frame in rigid relation thereto.

The bracket 18 is recurved to provide a supporting extension 19 on which is fulcrumed at 20 a runner shifting lever 21 of bell crank form. The arm 21 of the lever is curved and provided with an arcuate slot 22 in which the pin 11 above referred to is received so that when said lever 21 is swung to one side or the other, it shifts the runner 12 in a corresponding direction, said runner being provided with retaining flanges 23 to hold the same to the arm 13 of the sector lever while permitting said runner to slide freely in the direction of length thereof. The other arm 24 of the lever 21 has attached thereto an operating rod 25 which extends through the dash 26 of the machine and is provided with a suitable handle 27 and is also shown as provided with a longitudinal series of notches 28 adapted to engage a keeper lip 29 on the dash so as to maintain any adjustment of the rod 25.

The mechanism is shown in its operative position in Fig. 2 by full lines, the sector lever being actuated by the worm gear 15 and serving to move the connecting rod 10 back and forth so as to turn the lamps in unison with the steering wheels. When the lamp turning mechanism is not in use, the lever 21 is shifted by means of the rod 25 to the dotted line position of Fig. 2 in which the pin 11 is brought into line with the fulcrum pin 17 of the sector lever. Therefore, notwithstanding the fact that the sector lever is still actuated by the steering shaft 16, no movement is imparted to the rod 10 and hence the lamps for the reason that there is no relative movement between the pin 11 and the fulcrum pin 17. When adjusted to the last named position, the connections between the sector lever and the lamps remain idle thus doing away with excessive and unnecessary wear on the lamp supporting posts and other parts intimately associated therewith.

What I claim is:—

1. In headlamp control for motor vehicles, the combination of an oscillatory headlamp, a gear on the steering shaft, a sector lever actuated by said gear, a runner slidable on said lever toward and away from the fulcrum thereof, a connecting rod extending from said lever to said lamp for oscillating the latter, and means for sliding said runner on the sector lever including a shifting lever connected with said slide, and a manually operable device accessible to the driver in his seat for moving said shifting lever.

2. In headlamp control for motor vehicles, the combination of an oscillatory headlamp, a gear on the steering shaft, a sector lever actuated by said gear, a runner slidable on said lever toward and away from the fulcum thereof, a connecting rod extending from said lever to said lamp for oscillating the latter, manually controlled means for sliding said runner including a shifting lever connected with said slide and provided with an arcuate slot, and a pin on said runner which holds said connecting rod and works in the slot of said shifting lever.

In testimony whereof I affix my signature in presence of two witnesses.

PURL MURPHY.

Witnesses:
D. M. HIBBARD,
S. D. BELEW.

Copies of this patent may be obtained for five cents each, by addressing the "Commissioner of Patents, Washington, D. C."